(12) United States Patent
Hannum et al.

(10) Patent No.: US 10,554,029 B2
(45) Date of Patent: Feb. 4, 2020

(54) ENCLOSURE

(71) Applicant: Bentek Corporation, San Jose, CA (US)

(72) Inventors: Robert J. Hannum, San Jose, CA (US); Douglas E. McCracken, San Jose, CA (US)

(73) Assignee: BENTEK CORPORATION, San Jose, CA (US)

(*) Notice: Subject to any disclaimer, the term of this patent is extended or adjusted under 35 U.S.C. 154(b) by 0 days.

(21) Appl. No.: 15/806,658

(22) Filed: Nov. 8, 2017

(65) Prior Publication Data

US 2019/0140435 A1    May 9, 2019

(51) Int. Cl.
| | |
|---|---|
| H05K 7/20 | (2006.01) |
| H02G 3/08 | (2006.01) |
| H02G 3/14 | (2006.01) |
| H02S 40/34 | (2014.01) |
| H02G 3/03 | (2006.01) |

(52) U.S. Cl.
CPC .............. *H02G 3/081* (2013.01); *H02G 3/14* (2013.01); *H02S 40/34* (2014.12); *H02G 3/03* (2013.01)

(58) Field of Classification Search
None
See application file for complete search history.

(56) References Cited

U.S. PATENT DOCUMENTS

| | | | | |
|---|---|---|---|---|
| 4,656,559 A * | 4/1987 | Fathi | ................. | H05K 7/20409 361/721 |
| 5,228,515 A * | 7/1993 | Tran | ..................... | F28D 9/0037 165/166 |
| 6,144,556 A * | 11/2000 | Lanclos | ............. | H05K 7/20145 361/695 |
| 6,411,514 B1 * | 6/2002 | Hussaini | ................ | H05K 7/209 165/104.33 |
| 7,817,431 B2 * | 10/2010 | Baker | ..................... | B60R 11/02 174/50 |
| 8,000,096 B2 * | 8/2011 | Nemoz | ................ | H05K 7/1452 312/223.1 |
| 8,120,906 B2 * | 2/2012 | Li | ............................ | G06F 1/20 361/679.57 |
| 9,317,075 B2 * | 4/2016 | Ng | ......................... | G06F 1/182 |
| 9,545,032 B2 * | 1/2017 | Baer | .................. | H05K 7/20436 |
| 9,648,789 B2 * | 5/2017 | Krivonak | ............... | H05K 7/209 |
| 2013/0264919 A1 * | 10/2013 | Sullivan | .............. | H05K 5/0204 312/223.2 |
| 2014/0307373 A1 * | 10/2014 | Sullivan | .................... | G06F 1/16 361/679.02 |

* cited by examiner

*Primary Examiner* — Courtney L Smith
(74) *Attorney, Agent, or Firm* — Brundidge & Stanger, P.C.

(57) ABSTRACT

An enclosure has one or more panels produced by extruding and cut to desired length. An extruded panel of the enclosure may integrate heat sinks, threaded rod locations, and internal grooves to attach adjacent panels. Top and bottom plates may be joined to the panels by threaded rods passing from the top plate through to the bottom plate via the threaded rod locations engineered into the extrusion, enabling the panels and plates to be pulled together by turning the threaded rods. Once assembled, the enclosure may accommodate a variety of electrical equipment at time of assembly and/or at the enclosure installation site. The enclosure has applicability in electrical power distribution, for example as a combiner box in a solar power distribution system.

9 Claims, 5 Drawing Sheets

ENCLOSURE

TECHNICAL FIELD

The present invention relates to an enclosure for, e.g., electrical components in a power distribution system.

BACKGROUND

A power distribution system may receive electrical power from any of a variety of sources, including fossil fuels, wind, water, and solar. Some power distribution systems bring power from the source to the load; others distribute the power to a power grid, which delivers the power to the end use.

In solar power distribution systems, electricity may be generated by photovoltaic (PV), or solar, panels (modules) wired together in series. A series connection of modules is known as a "string". In some systems, particularly those of larger scale (e.g., more than two strings), the strings are introduced to a "combiner" or "combiner box", where the input string cables may be combined into one or more output cables. In systems having multiple combiners, the output of each combiner may be introduced to a "re-combiner box" to be combined into one or more output cables. Combiner boxes and re-combiner boxes may be similar in structure and thus in this disclosure, "combiner" and "combiner box" will be used with the understanding that the related description applies equally to a "re-combiner" or "re-combiner box".

A combiner box may contain a variety of mechanical, electrical, and electronic components. For example, a combiner box may house input fuses for corresponding input strings, bus bars, terminals for combining the inputs after the fuses, a DC disconnect, a surge protector and other overcurrent protection devices, current monitoring sensors, arc-fault sensors, and rapid-disconnect contacts. Pre-terminated input whips may be provided to connect string cables to the combiner box via the whips instead of hard-wiring to fuse terminals inside the box.

Combiner boxes may be installed outdoors, often near the PV panels, where they are exposed to environmental considerations such as rain, ultraviolet radiation, humidity, animals, etc. They may be mounted on a roof, wall, or bolted to the floor. In any installation, it is desirable for the combiner box to be durable, wieldy, and versatile.

SUMMARY

In a first aspect, an enclosure comprises a first panel having a heat sink and a second panel, each of the first panel and second panel having respective passages, rods in corresponding ones of the passages, a third panel, and fourth and fifth panels each having respective holes, wherein the first and second panels are coupled together via the third panel, wherein the rods in the passages are each coupled to the fourth and fifth panels via corresponding ones of the holes in the fourth and fifth panels, wherein the first and second panels are coupled to the fourth and fifth panels via the rods in the passages, and wherein the first panel comprises the heat sink and is integrated with the heat sink as an extruded whole.

In a second aspect, a method of manufacturing an enclosure comprises extruding of a structural material a first panel having an integrated heat sink, coupling together the first panel with a second panel via a third panel as a first assembly of at least the first, second, and third panels, wherein the first and second panels oppose each other in the coupling, coupling the first assembly with fourth and fifth panels as a second assembly of at least the first, second, third, fourth, and fifth panels, wherein the fourth and fifth panels oppose each other in the coupling, and coupling as an enclosure the second assembly with a removable pane.

In a third aspect, an electrical power distribution system comprises an enclosure that includes a first panel having an integrated heat sink, wherein the first panel and integrated heat sink comprise an extruded structural material, a second panel, wherein the first and second panels each have respective passages, rods in corresponding ones of the passages, a third panel, a fourth panel having holes configured to receive first ends of corresponding ones of the rods, and one or more ports each configured to pass an electrical cable, and a fifth panel having holes configured to receive second ends of corresponding ones of the rods, wherein the first and second panels are coupled together the third panel, wherein the rods in the passages are each coupled to the fourth and fifth panels via the corresponding ones of the holes in the fourth and fifth panels, and wherein the first and second panels are coupled to the fourth and fifth panels via the rods in the passages and coupled to the fourth and fifth panels; and electrical components mounted on the third panel.

BRIEF DESCRIPTION OF THE DRAWINGS

The accompanying figures, together with the written disclosure, serve to illustrate embodiments of a monitoring system. One of ordinary skill in the art will recognize that the particular embodiments illustrated in the figures are merely exemplary and are not intended to limit the scope of the present invention.

DETAILED DESCRIPTION

The present disclosure relates to an enclosure and, more particularly, to an enclosure, method of manufacturing an enclosure, and system of electrical power distribution having an enclosure configured, by way of nonlimiting example, to decrease the complexity, reduce the weight and cost, allow for better heat dissipation, and allow for greater customization of the enclosure.

The following description is presented to enable one of ordinary skill in the art to make and use the disclosed embodiments and modifications thereof, and is provided in the context of a patent application and its requirements. Various modifications to the disclosed embodiments and the principles and features described herein will be readily apparent to those of ordinary skill in the art. Thus, the present disclosure is not intended to limit the invention to the embodiments shown; rather, the invention is to be accorded the widest scope consistent with the principles and features described herein.

Figure 1:
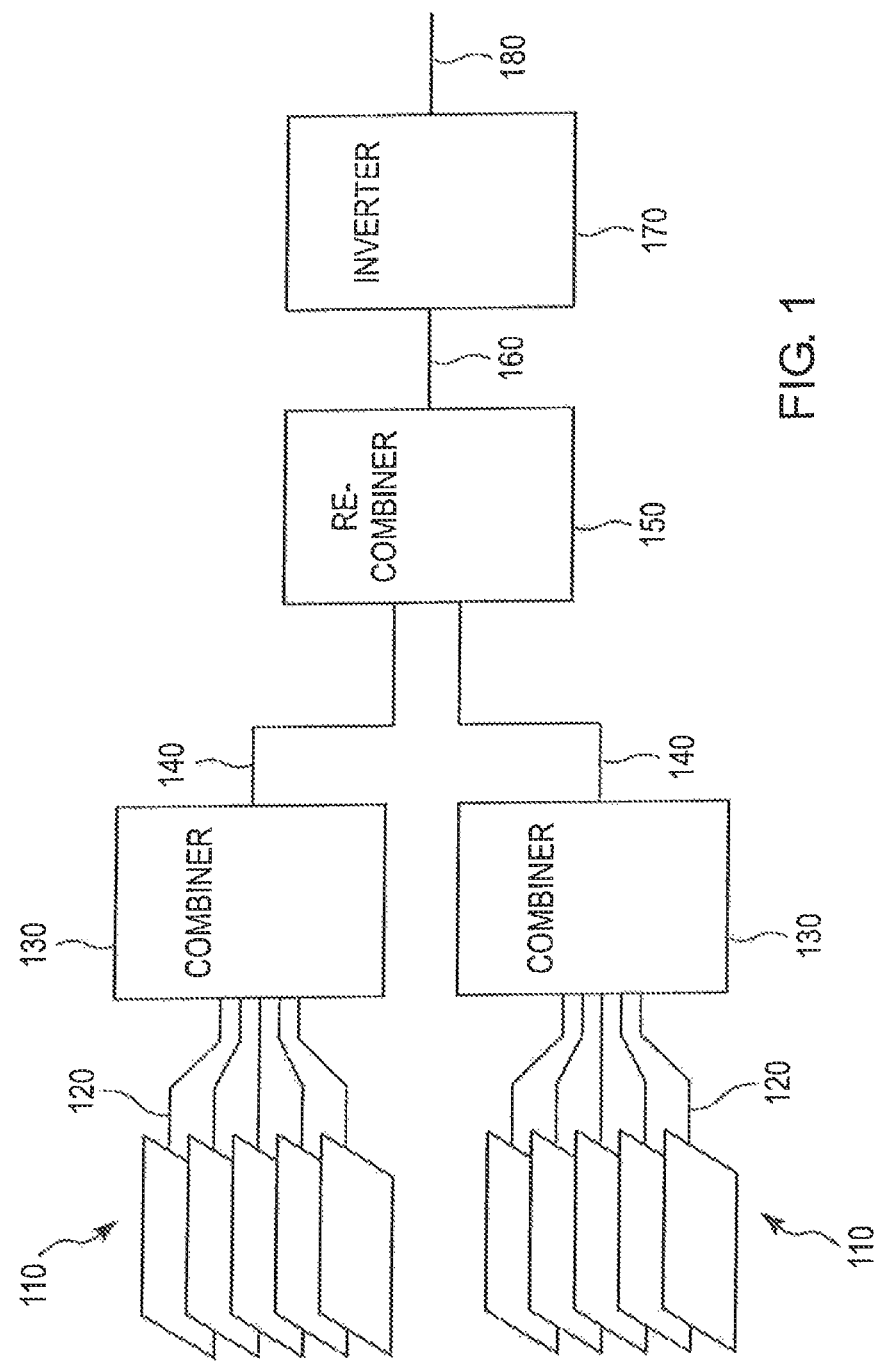
FIG. 1 illustrates an example of a solar power system in accordance with one or more embodiments described herein.

FIG. 1 illustrates an example of a solar power system. By way of nonlimiting example, the solar power system may include, for example, a plurality of strings 110, each comprising one PV panel or a series connection of PV panels. PV panels are sometimes referred to as PV modules, solar panels, or solar modules, to name three examples. The PV panel or panels in each string 110 may generate direct current from sunlight by the photovoltaic effect. At least some of strings 110 may be arranged in electrical parallel. Each string 110 may output direct current power from the last PV panel in the series via one or more cables 120, which may provide the direct current as an input to a combiner 130. In accordance with the parallel nature of strings 110, the direct current inputs to combiner 130 may be parallel inputs. In each combiner 130, the direct current inputs may be combined into one output for transmission to a recombiner 150 via cables 140. Recombiner 150 may provide direct current output to an inverter 170 via a cable 160 in the illustration shown. The output of inverter 170 may be provided to a load or to a power grid, for example, via a cable 180.

One of ordinary skill will understand that a single combiner 130 may output directly to inverter 170, or multiple recombiners 150 may be employed, each of which may output to a re-recombiner (not shown) which in turn may provide the input to inverter 170. The scale of combiners and recombiners may be determined based on the size of the power distribution system and load, among other things.

Figure 2A:
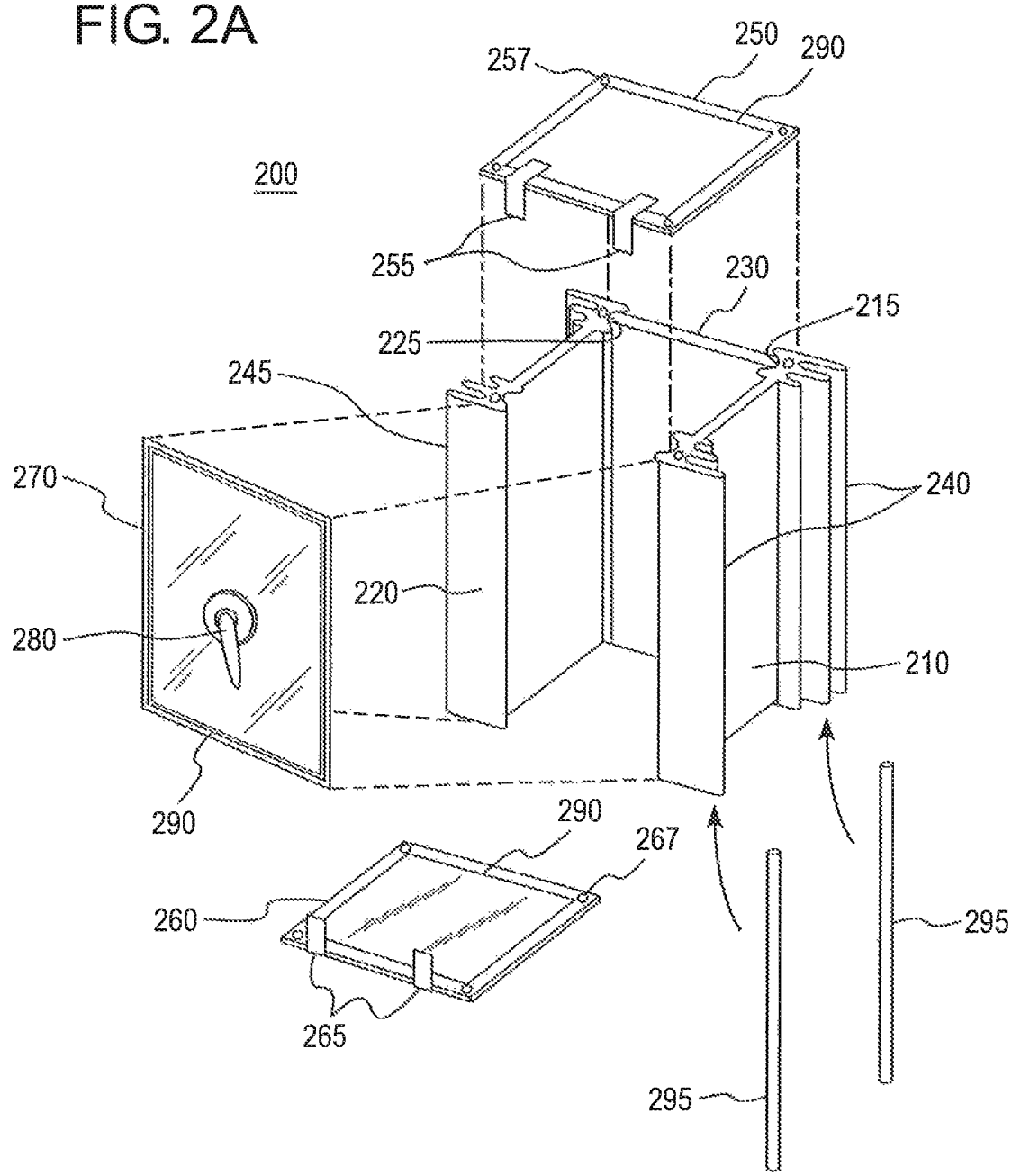
FIG. 2A is an exploded view illustrating an enclosure in accordance with one or more embodiments described herein.

FIG. 2A is an exploded view illustrating an enclosure 200 in accordance with one or more embodiments described herein. As shown in FIG. 2A, enclosure 200 may include a first panel 210, a second panel 220, and a third panel 230. In one or more embodiments, third panel 230 may couple together first panel 210 and second panel 220 to form a first assembly. For example, in one or more embodiments, first panel 210 and second panel 220 may each be provided with one or more grooves such as grooves 215 and 225, respectively, suitable for third panel 230 to be "slid" into corresponding ones of the one or more grooves, thereby bringing together first panel 210 and second panel 220 to form the first assembly. In this regard, third panel 230 may be made of any desired width (e.g., the dimension between first panel 210 and second panel 220), thereby setting the width of enclosure 200 accordingly in one or more embodiments. First panel 210 and second panel 220 thus may be considered "side" panels and third panel 230 a "back" panel of enclosure 200 when configured as shown, in what might be termed an "upright" orientation for ease of description, although the first assembly (indeed, several portions of enclosure 200 or even the entire enclosure itself) may be assembled and/or mounted in any of a variety of orientations.

In one or more embodiments, first panel 210 may be integrally formed with one or more heat sinks 240, the function of which may include dissipating heat from the structure of enclosure 200 or the interior of enclosure 200. Second panel 220 may be similarly formed with one or more heat sinks 245. In one or more embodiments, first panel 210 and heat sink(s) 240 may comprise an extruded structural material such as aluminum, plastic, or a composite, for example extruded as one panel comprising first panel 210 and heat sink 240 and cut to a desired length (height). Second panel 220 and heat sink(s) 245 also may comprise an extruded structural material such as those just mentioned, additionally or alternatively. In one or more embodiments, third panel 230 may also comprise an extruded structural material such as those just mentioned, and may also have one or more heat sinks. One of ordinary skill in the art will understand that aluminum, plastic, and composites are examples of extruded structural materials and are not limiting.

Enclosure 200 may further include a fourth panel 250 and a fifth panel 260. Fourth panel 250 and fifth panel 260 may be "top" and "bottom" panels, respectively, of enclosure 200 when oriented in the upright configuration. A sixth panel 270 may be a removable or openable barrier such as a door which, if removed, may permit access to at least part of the interior of enclosure 200. To this end, sixth panel 270 may be removably attached to enclosure 200 by any suitable structure and/or hingedly attached to enclosure 200, to be bodily removed or swung open, respectively, using a handle 280, for example. In one or more embodiments, sixth panel 270 may be sufficiently clear or provided with a sufficiently clear window to permit viewing of at least part of the interior of enclosure 200.

Fourth panel 250 may be provided with a fastener such as one or more latches 255 (two are shown by way of example). Similarly, fifth panel 260 may be provided with a fastener such as one or more latches 265. The fasteners (e.g., latches 255 and 265) may be configured to secure sixth panel 270 to at least part of enclosure 200.

To enhance sealing properties of various components of enclosure 200, a gasket material 290, applied with an adhesive as needed, may be provided in one or more of the locations shown. One of ordinary skill in the art will understand that gasket material 290 may be provided at other locations additionally or alternatively. For clarity of illustration, not all possible locations are shown.

Figure 2B:
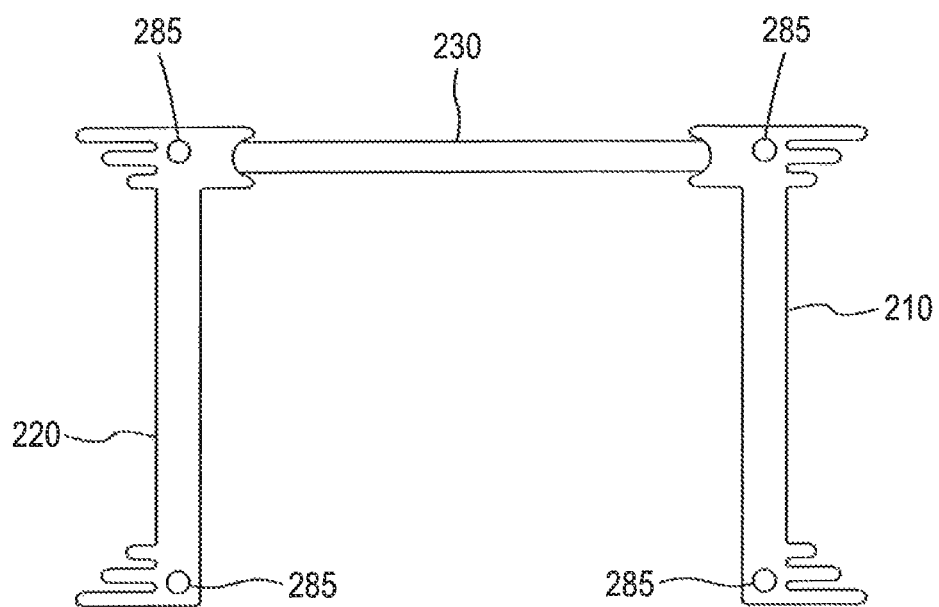
FIG. 2B illustrates an example of side and back panels of the enclosure viewed from above. in accordance with one or more embodiments described herein.

FIG. 2B illustrates an example of first panel 210, second panel 220, and third panel 230 viewed from above. As shown in FIG. 2B, first panel 210 and second panel 220 may be provided with one or more passages 285. With reference also to FIG. 2A, fourth panel 250 and fifth panel 260 may be provided with one or more holes 257 and 267, respectively, corresponding to passages 285, to receive one or more rods 295. In one or more embodiments, rods 295 may be passed through corresponding passages 285 and coupled at ends thereof to fourth panel 250 and fifth panel 260 via holes 257 and 267. In one or more embodiments, rods 295 may be provided with threaded ends that extend through holes 257 and 267 sufficiently to receive, e.g., nuts (other hardware may be used). Additionally or alternatively, one or more of holes 257 and 267 may have threads such that one or more corresponding rods 295 may be secured to fourth panel 250 and/or fifth panel 260 by threading the rods 295 into those holes 257 and 267 having threads. Thus, in some embodiments, with third panel 230 joined to first panel 210 and second panel 220 in the first assembly, enclosure 200 may be "pulled together" by drawing fourth panel 250 and fifth panel 260 toward each other by attaching rods 295 to fourth panel 250 and fifth panel 260, such that first panel 210, second panel 220, third panel 230, fourth panel 250, and fifth panel 260 form a second assembly of enclosure 200.

Figure 2C:
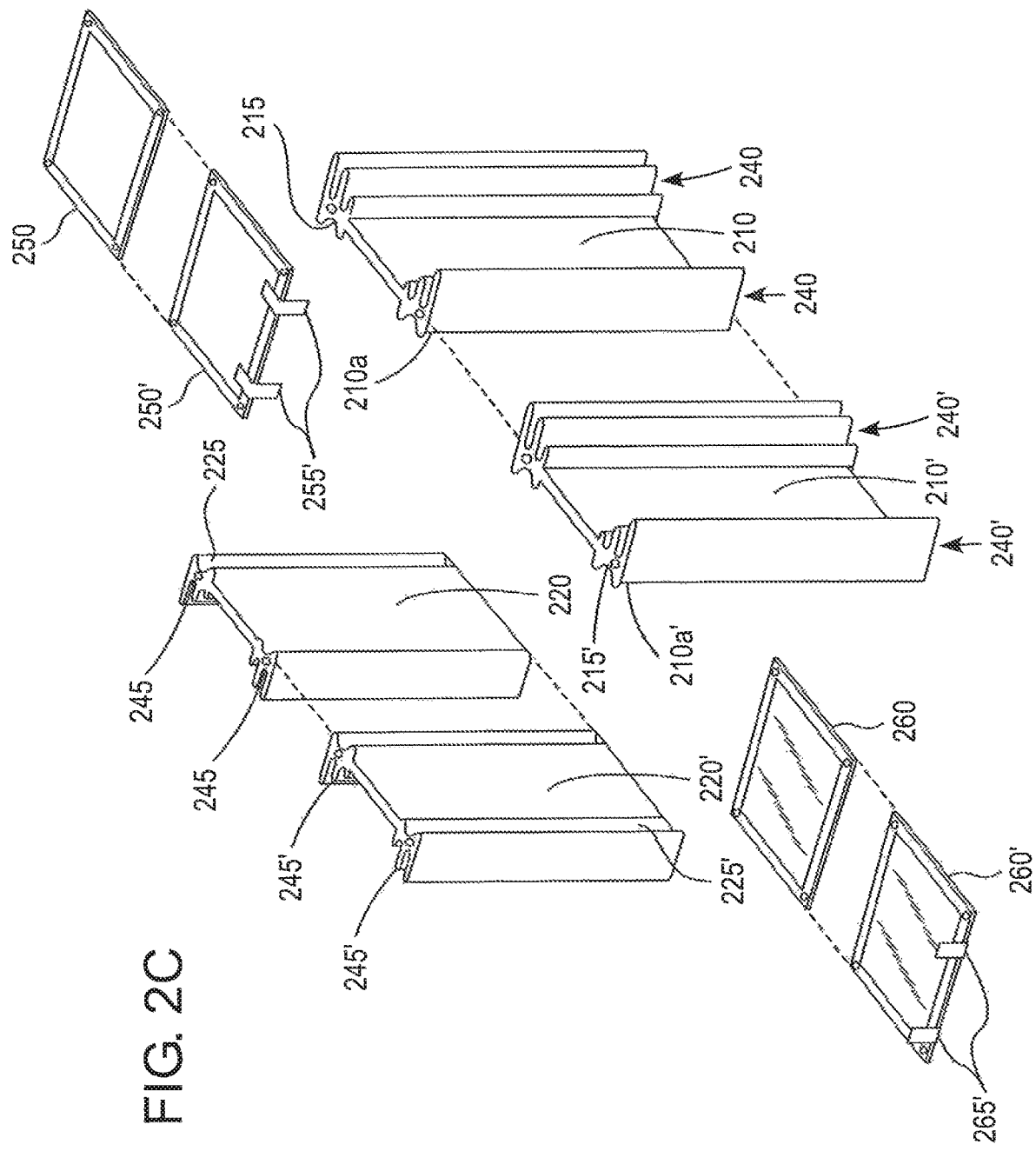
FIG. 2C illustrates a feature by which the sides of the enclosure may be configured with multiple panels to permit expansion in the "depth" direction of the enclosure in accordance with one or more embodiments described herein.

FIG. 2C illustrates a feature by which the sides of enclosure 200 may be configured with multiple panels to permit expansion in the "depth" direction of enclosure 200 in one or more embodiments. As shown in FIG. 2C, first panel 210 and second panel 220 may be configured for joining using any of a number of structures, including but not limited to, tongue-and-groove, hinges, bolts and nuts, pins, and/or rods and passages (e.g., perpendicular to rods 295 and passages 285) to name a few, whereby an additional first panel 210' and an additional second panel 220' (optionally with one or more heat sinks 240' and 245') may be coupled to first panel 210 and second panel 220, respectively. One or more additional fourth panels 250' and one or more additional fifth panels 260' may be added using similar couplings. In such case, additional fourth panel 250' and additional fifth panel 260' may not need to be outfitted with the latch securements shown in FIG. 2A. However, it is contemplated that additional rods (not shown) corresponding to rods 295 may be added to couple one or more additional first panels 210', second panels 220', fourth panels 250', and fifth panels 260' as described above with first panel 210, second panel 220, fourth panel 250, and fifth panel 260 to pull together enclosure 220 with third panel 230 (or multiple third panels 230 as the case may be).

Figure 3:
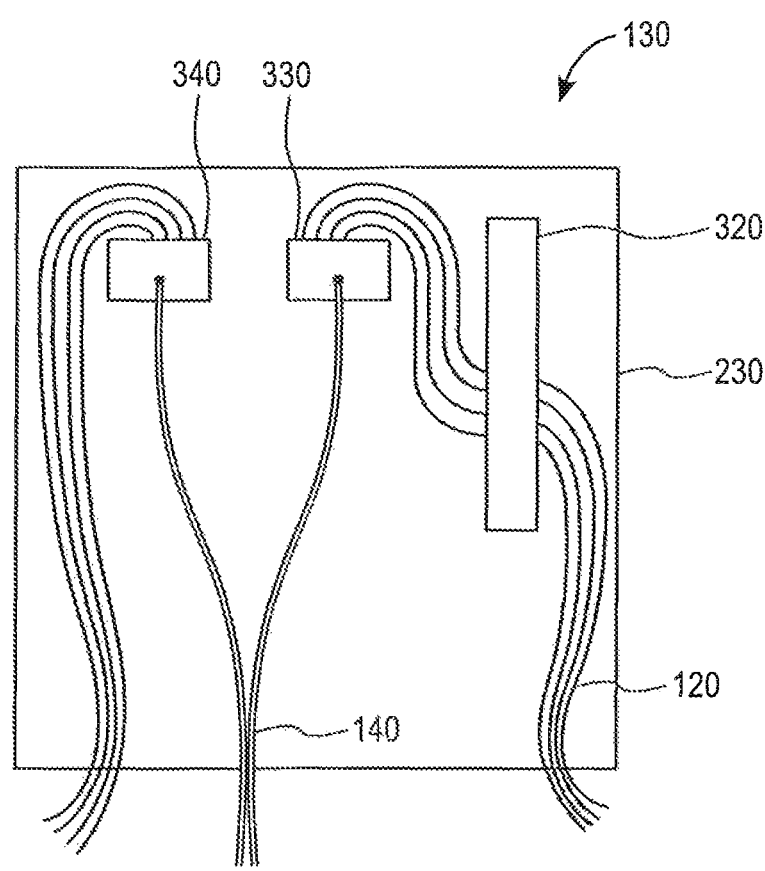
FIG. 3 illustrates a portion of a combiner in accordance with one or more embodiments described herein.

FIG. 3 illustrates a portion of an example combiner 130 incorporating an enclosure such as enclosure 200, depicted without first panel 210, second panel 220, fourth panel 250, fifth panel 260, or sixth panel 270 for clarity. As shown in FIG. 3, combiner 130 may comprise an enclosure corresponding to enclosure 200, fuses 320, a positive busbar or block 330, and/or a negative busbar or block 340. configured as shown to receive four input cables 120 and combine their inputs to a common output cable 140. Combiner 130 may house a variety of other components such as, for example, a DC disconnect, surge protection components, rapid-disconnect contacts, cable whips, pre-wiring, and/or current monitoring, arc-fault, and other sensors.

Numerous variations and modifications may be made to one or more of the embodiments as illustrated and described. For example, both first panel 210 and second panel 220 may be integrally formed with one or more heat sinks such as heat sink(s) 240 and 245 by, for example, extruding a structural material such as aluminum, plastic, or a composite. First panel 210 and heat sink(s) 240 (and/or second panel 220 and heat sink(s) 245) may be separate components coupled by, e.g., a thermally conductive adhesive. As separate components, one or both of first panels 210, 220 and one or both of their respective heat sinks 240, 245 may comprise an extruded structural material as described. In one or more embodiments, each of first panel 210, second panel 220, third panel 240, fourth panel 250, fifth panel 260, and sixth panel 270 may be a single panel or comprise multiple panels joined together in any suitable fashion of which FIG. 2C shows one example. One or more of the panels and subpanels may comprise an extruded structural material such as aluminum, plastic, or a composite, and may comprise fiberglass, stainless steel, powder-coated steel, painted steel, polyester (non-glass-filled), or other material, including those understood by one of ordinary skill in the art to be suitable.

One or more of the passages through which rods 295 pass may be formed in first panel 210 or second panel 220 as described above, but also may be formed in third panel 230 or in one or more heat sinks 240, 245 formed in panels 210, 220. Rods 295 need not be fastened via discrete nuts; one or more may be fastened by matching threads in holes 257 and/or holes 267, integrated nuts associated with either, or other fastener suitable for pulling together the panels as described.

First panel 210 and second panel 220 may have respective grooves for corresponding tongues or edges of third panel 230 to engage in the first assembly. Additionally or alternatively, fourth panel 250 and/or fifth panel 260 may engage one or more of first panel 210, second panel 220, and third panel 230 in a similar manner. Likewise, sixth panel 270 may engage one or more of first panel 210, second panel 220, third panel 230, fourth panel 250, and fifth panel 260 in a similar fashion. One or more adjacent panels may also be joined by tongue-in-groove coupling, whereby both joined edges are grooved and tongues are inserted to form the joint, or by hinges, permitting one or more panels to be swung out of the way as needed for the convenience of, e.g., service within enclosure 200, without needing to remove such panels.

In accordance with the heat dissipating properties of heat sinks 240, 245, in one or more embodiments heat producing components contained in enclosure 200 may be mounted on first panel 210 or any panel having co-extruded heat sink(s) 240, 245. For example, first panel 210 and/or second panel 220 may comprise an extruded structural material and have one or more electrical components mounted thereon.

Furthermore, many possible features of enclosure 200, its components, and/or its contents are not shown for clarity. For example, enclosure 200 and its components may include one or more vents, drains, or conduit fittings. Enclosure 200 may be lockable via latches 255 and 265 or otherwise. The contents of enclosure 200 may include one or more disconnect switches, output lugs, standoffs, surge protectors or other overcurrent protection devices, integral connectors, whips, harnesses, current monitoring devices, cable glands, power supplies, and/or struts. Some or all of these contents may be mounted to first panel 210 (or other panel) to take advantage of the heat dissipating properties of a heat sink or sinks mounted thereon.

One or more heat sinks 240, 245 may take any number of configurations in addition to those shown and may comprise a single element or multiple elements. Any panel on which a heat sink is mounted may be a suitable panel on which to mount an electrical component or components to take advantage of its heat dissipating properties, and provided a benefit of customization to the enclosure purpose, environment, heat dissipation needs, etc.

Rods 295 being joined by fasteners such as nuts are just one example for bringing the various panels together to form the second assembly. Other suitable examples will be apparent to one of skill in the art. For example, one end of each rod may be provided with a cap or other structure to prevent the rod from passing completely through the corresponding hole, and a nut or other fastener applied at the opposite end. Furthermore, the passages in which rods 295 are located do not have to be continuous or extend the length of the panels.

Although the present invention has been described in accordance with the embodiments and modifications thereof as shown, one of ordinary skill in the art will readily recognize that there could be variations and other modification to the embodiments and those variations and modifications would also be within the spirit and scope of the present invention.

What is claimed is:

1. An enclosure, comprising:
   a first panel having a heat sink and a second panel, each of the first panel and second panel having respective passages;
   rods in corresponding ones of the passages;
   a third panel; and
   fourth and fifth panels each having respective holes;
   a sixth panel through which at least part of the enclosure interior is viewable;
   wherein the first and second panels each comprise an extruded structural material;
   wherein the first and second panels have respective first and second grooves;
   wherein the first and second panels have respective third and fourth grooves;

wherein the third panel is located in the first and second grooves in coupling together the first and second panels wherein the sixth panel is located in the third and fourth grooves;

wherein the first and second panels are coupled together via the third panel;

wherein the rods in the passages are each coupled to the fourth and fifth panels via corresponding ones of the holes in the fourth and fifth panels;

wherein the first and second panels are coupled to the fourth and fifth panels via the rods in the passages; and wherein the first panel comprises the heat sink and is integrated with the heat sink as an extruded whole.

2. The enclosure of claim 1, wherein the first and second panels have respective first and second grooves; and wherein the third panel is located in the first and second grooves in coupling together the first and second panels.

3. The enclosure of claim 1, wherein the rods are each coupled to the fourth and fifth panels via threads mated with corresponding threads in the holes.

4. The enclosure of claim 1, wherein the rods are each coupled to the fourth and fifth panels via threads mated with corresponding threads in the holes.

5. The enclosure of claim 1, wherein the rods are each coupled to the fourth and fifth panels via threads mated with corresponding nuts.

6. An electrical power distribution system, comprising:
an enclosure that includes:
a first panel having an integrated heat sink, wherein the first panel and the integrated heat sink comprise an extruded structural material;
a second panel, wherein the first and second panels each have respective passages;
rods in corresponding ones of the passages;
a third panel;
a fourth panel having holes configured to receive first ends of corresponding ones of the rods, and one or more ports each configured to pass an electrical cable; and
a fifth panel having holes configured to receive second ends of corresponding ones of the rods;
a sixth panel through which at least part of the enclosure interior is viewable;
wherein the first and second panels have respective first and second grooves;
wherein the third panel is located in the first and second grooves in coupling together the first and second panels;
wherein the first and second panels have respective third and fourth grooves;
wherein the sixth panel is located in the third and fourth grooves;
wherein the first and second panels are coupled together via the third panel;
wherein the rods in the passages are each coupled to the fourth and fifth panels via the corresponding ones of the holes in the fourth and fifth panels; and
wherein the first and second panels are coupled to the fourth and fifth panels via the rods in the passages and coupled to the fourth and fifth panels;
and electrical components mounted on the third panel.

7. The electrical power distribution system of claim 6, wherein the rods are each coupled to the fourth and fifth panels via threads mated with corresponding threads in the holes.

8. The electrical power distribution system of claim 7, wherein the second panel comprises an extruded structural material.

9. The electrical power distribution system of claim 8, wherein the rods are each coupled to the fourth and fifth panels via threads mated with corresponding threads in the holes.

* * * * *